Jan. 22, 1957  A. KREIDLER  2,778,493
APPARATUS FOR THE PRODUCTION OF TUBULAR
BODIES WITH VARIABLE CROSS-SECTION
Filed Dec. 23, 1952  4 Sheets-Sheet 1

Inventor:
Alfred Kreidler

Jan. 22, 1957 A. KREIDLER 2,778,493
APPARATUS FOR THE PRODUCTION OF TUBULAR
BODIES WITH VARIABLE CROSS-SECTION
Filed Dec. 23, 1952 4 Sheets-Sheet 3

Inventor:
Alfred Kreidler

United States Patent Office 2,778,493
Patented Jan. 22, 1957

2,778,493

APPARATUS FOR THE PRODUCTION OF TUBULAR BODIES WITH VARIABLE CROSS-SECTION

Alfred Kreidler, Stuttgart, Germany

Application December 23, 1952, Serial No. 327,569

Claims priority, application Germany December 31, 1951

3 Claims. (Cl. 207—3)

It is one object of the present invention to provide an apparatus for the production of elongated bodies employing an extrusion process in which tools (dies or mandrels) of correspondingly different shape operate upon the pressed article in successive operations.

It is another object of the present invention to provide an apparatus for the production of elongated bodies employing the aid of various devices. The tools, for example, the dies, can be exchangeable after each separate extrusion section. Also several dies—at least two—can be disposed behind each other which are held during the extrusion operation by disengageable stops.

It is yet another object of the present invention to provide a process for the production of elongated bodies employing control members for the disengagement of the stops, which may be influenced by the progress of the extrusion operation, which control members are very suitable for rapid operation—which is particularly important in hot pressing. The actuation of the control members can be effected by the press ram or by the extrusion. The means for the purpose may be mechanical, electrical, hydraulic or pneumatic apparatus. The press operator need not then pay attention to the removal of the stops at the right time, but the latter are automatically effected depending on the actual progress of the extrusion operation.

With these and other objects in view which will become apparent in the following detailed description, the present invention will be clearly understood in connection with the accompanying drawings, in which.

Figure 1:
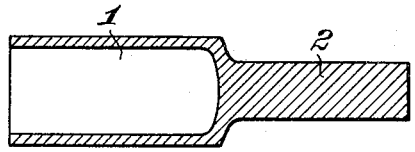
Figures 1 to 4 are diagrammatic details showing parts of an apparatus for carrying out the extrusion process with exchangeable dies.
Figure 2:
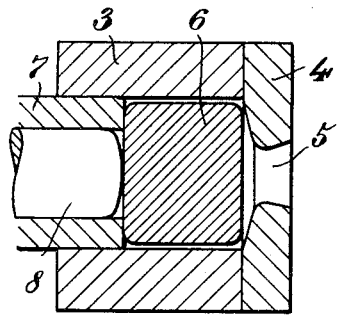

In Fig. 1, there is shown in section an oblong hollow body 1 with a solid projection 2 which is to be manufactured by the process of the invention. For this purpose a bar 6 is inserted as shown in Fig. 2 into a holder 3 which is closed by an exchangeable die 4 with an aperture 5 corresponding to the cross section of the extension 2. A mandrel 8 is longitudinally displaceable in a press ram 7 which fits within the holder 3.

Figure 3:
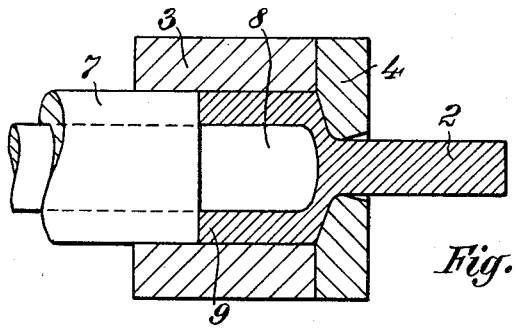
Figure 4:
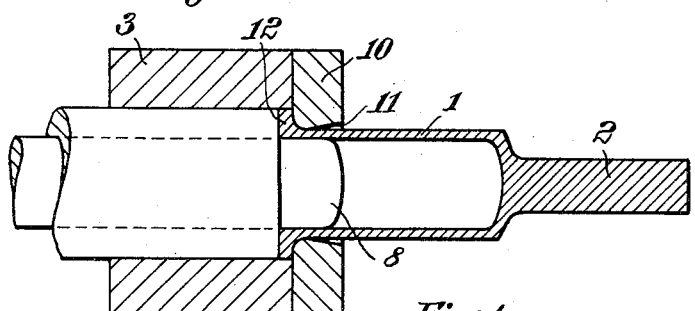

First, the bar 6 is perforated by the mandrel 8, the displaced material flowing out of the matrix aperture 5 in the shape of the extension 2 as an extrusion. A bowl-shaped hollow body 9 with the extension 2 is thus produced, as shown in Fig. 3. Now the die 4 is removed and a die 10 applied with a correspondingly larger aperture 11 (Fig. 4). By an initially joint advance of the ram 7 and the mandrel 8 the material of the bowl 9 is extruded from the aperture 11. After its entrance into the aperture 11, the mandrel 8 remains stationary whilst the ram 7 advances further and completely extrudes the material out of the annular gap in the form of the hollow body 1 between the mandrel 8 and the die aperture 11. The remainder of the extrusion 12 can be removed at the end of this operation. There is no objection, however, to effecting this remainder of the extrusion by a corresponding shaping of the inner surface of the die and/or the frontal surface of the press ram 7, as a flange projection and the like on the body to be manufactured.

Figure 5:
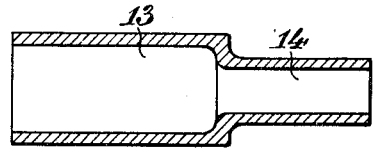
Figs. 5 to 8 are diagrammatic details showing parts of an apparatus with two dies disposed behind each other which are held during the extrusion operation by disengageable stops.
Figure 6:
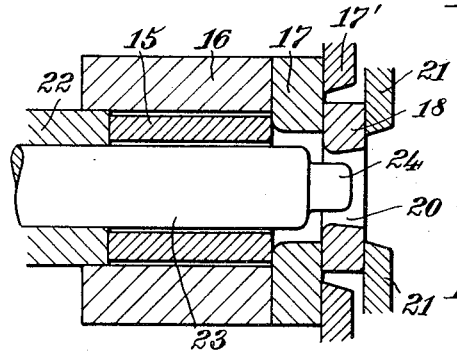
Figure 7:
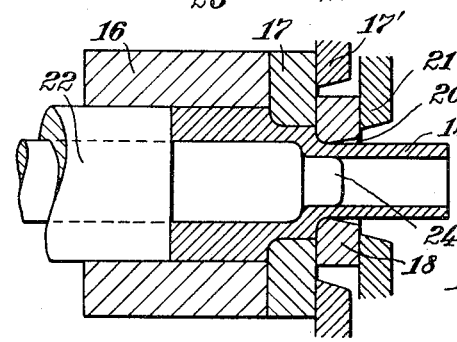
Figure 8:
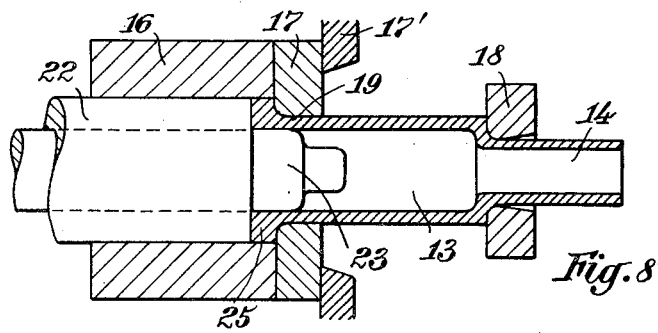

The body shown in section in Fig. 5 consists of a hollow cylinder 13 and a tubular continuation 14. For its construction a thick-walled hollow cylindrical tube 15 is inserted, as shown in Fig. 6, into a holder 16. The latter is closed by dies 17—18 disposed behind each other, the apertures 19 and 20 of which correspond respectively to the outer diameters of the sections 13 and 14 of the hollow body to be produced. One of the dies 17 is connected to the holder 16 during the pressing by a stop constituted by the die 18 whilst the rear die 18 is supported by a removable stop 21. The press again has a hollow ram 22 and a mandrel 23, 24, this time stepped, displaceably enclosed therein. The mandrel 23, 24 is inserted until its thicker section 23 projects into the large aperture 19 and its thinner section 24 in the narrower aperture 20. In actual extrusion pressing the mandrel 23, 24 remains stationary. By advancing the ram 22, the material is first extruded through the annular gap between the narrower die aperture 20 and the thinner section of the mandrel 24 in the shape of the tubular extension 14 until the latter has attained the required length. This movement is shown in Fig. 7. The stops 21 are then removed. In a further extrusion process the material flows out through the annular gap between the larger die aperture 19 and the thicker section of the mandrel 23, in order thus to produce the hollow cylinder 13. The die 18 moves along at the same time on the extrusion. The remainder of the extrusion 25 is separated after disengagement of the stops 17' and the removal of the die 17, unless a body with the corresponding flange, projection or the like is to be manufactured.

Figure 9:
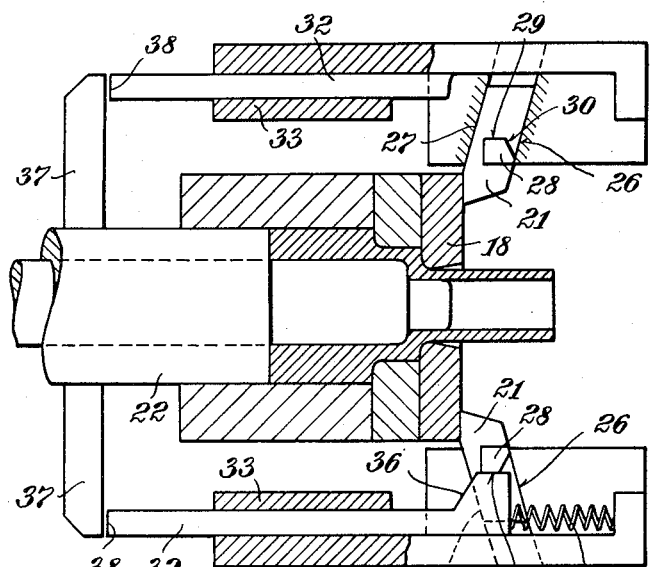
Figs. 9 and 10 are sections through an extrusion apparatus with a mechanical control device influenced by the ram for the removal of the abutments of one of the dies.
Figure 10:
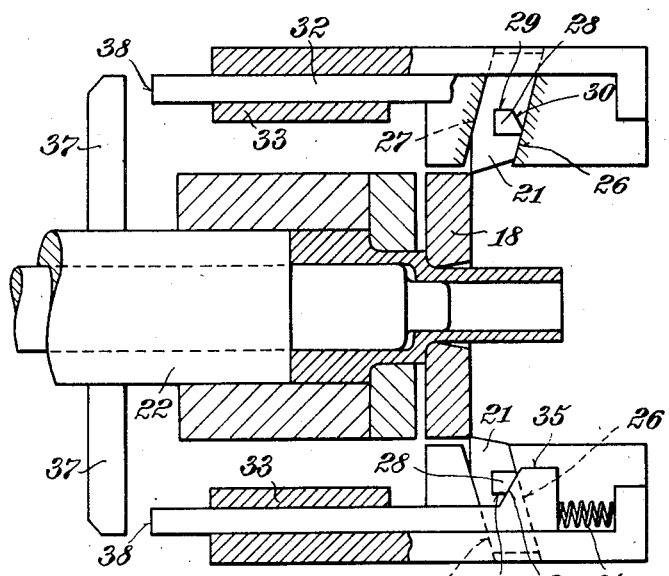

Figs. 9 and 10 show the control device for the removal of the stops 21 during the above described extrusion operation; namely, Fig. 9 at the moment just before the disengagement of the stops 21 and Fig. 10 shortly thereafter. The stops 21, a suitable number of which are disposed on the circumference on the die 18, are contained at any given moment in sliding surfaces formed by surfaces 26, 27 extending obliquely outwards. They have cams 28 with locking surfaces 29 extending parallel to the extrusion direction and control surfaces 30 which extend obliquely to the extrusion direction. A slide 32 which is enclosed by a guide 33 parallel to the extrusion direction and supported by spring 34 is associated with each abutment 21. (For the sake of clarity in Figs. 9 and 10, the upper half of the slide is partially omitted and the spring completely.) For co-operation with the corresponding surfaces on the cam 28 of the abutment 21, the slide has a locking surface 35 extending parallel to its direction of motion and an obliquely extending control surface 36. Arms 37 are mounted on the press ram 22 for the stop against the frontal surface 38 of the control slides 32.

When the extrusion operation has advanced as far as is shown in Fig. 7, the arms 37 come into contact with the frontal surfaces 38 of the control slides 32 and displace these during the further advance of the ram 22 against the action of the spring 34 until the locking surfaces 35 of the slide 32 have slid away under the corresponding surfaces 29 of the cams 28. Now the operational pressure can displace outwardly, by way of the die 18, the stops 21 along their oblique sliding surfaces 26, 27 until they—as shown in Fig. 10—have released the die 18. At the same time, the stops 21 with their cams 28 have by the co-operation of the control surfaces 30 and 36 displaced the slides 32 further in the extrusion direction so that the latter have received with their frontal surfaces 38 a certain lead relative to the stop member 37 of the press ram 22. Owing to the die 18 being taken along by the extrusion the stops 21 are now at first prevented from re-engaging under the action of the spring 34. When the die 18 is then past the nose-like projections, the arms 37 have again reached the frontal surfaces 38 of the slides 32 and provide for further disengagements of the stops 21. There can, however, be provided separate locking members (not shown) which keep the stops 21 disengaged after the return of the ram until a stamping is inserted for the next extrusion and the die 18 is in its place. Corresponding control devices may also be provided for the stops 17' (which are not shown in Figs. 9 and 10 for the sake of clarity).

Figure 11:
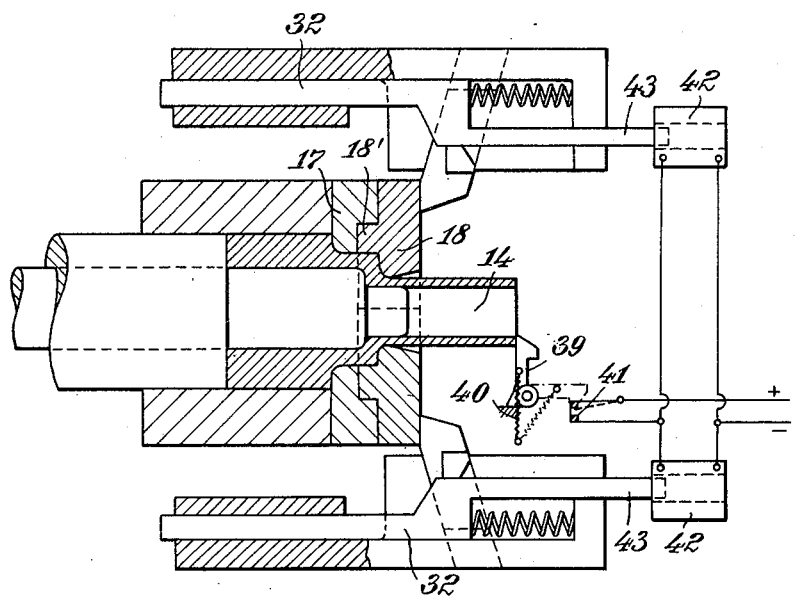
Fig. 11 is a section through an extrusion apparatus with an electric control device influenced by the extrusion.

The electric control device illustrated in Fig. 11 is released by the extrusion. A feeler member 39 is held in the path of the extrusion by a spring 40 in the manner of a locking device preventing it from going beyond the dead-centre. Upon contact of the extrusion 14 with the feeler member 39, the latter swings round into the chain-dotted position thus closing a switch 41 for the circuit of solenoids 42. These then attract their respective armatures 43 attached to the slides 32, the slides 32 move to the right and thus effect the unlocking of the stops 21.

In this form of construction the die 18 consists of a plurality of parts. Its parts have projections, the whole of which form a ring 18' which fits with its outer surface into a corresponding extension of the die 17, thereby holding the die 18 together in the assembled condition. As soon as it is pushed with its ring 18' out of the die 17 by the advancing extrusion after the disengaging of the abutments 21, the parts of the die fall away from the extrusion, so that they cannot run against the feeler member 39.

While I have disclosed several embodiments of the present invention, it is to be understood that these embodiments are given by example only and not in a limiting sense, the scope of the present invention being determined by the objects and the claims.

I claim:

1. An extrusion apparatus for making an elongated body having a length of large cross section and a length of small cross section comprising a pressure chamber having opposite ends and adapted to receive a blank, ram means extending through one end of said chamber adapted to apply pressure to the blank, a first die having a die aperture the size of a large cross section adapted to restrict the other end of said chamber, a first stop means for holding said first die against movement in its operative position, a second die having a die aperture the size of the smaller cross section ahead of and in alignment with said first die and adapted to further restrict the said other end of said chamber, said second die being adapted to move in the direction of the extruded length, a second stop means capable of holding said second die in its operative position against movement in the direction of the extruded length, said aforesaid structure being such that said second die sizes the body to a length of the smaller cross section, and, upon release of said second stop means, allows the first die to finish the large cross section, the shoulder formed by the different cross sections carrying said second die along with the extruded product and means responsive to the progress of the extrusion operation for releasing said second stop means for movement to release said second die, so that the second die may be carried with the extruded body upon finishing a predetermined length of the portion of the smaller cross section of said elongated body so as to render said second die inoperative and to permit continuation of extrusion of said elongated body through said first die only.

2. An extrusion apparatus, as set forth in claim 1, in which said second stop means includes slides transversely movable into holding relation with said second die, guides for guiding said slides for movement diagonally out of position, whereby the force of extrusion will move said slides to inoperative position to release said second die, abutment means for holding said slides against movement and means operated by said ram means for releasing said abutment means when said second die has finished its extruded length.

3. An extrusion apparatus, as set forth in claim 1, in which said responsive means includes an electrical switch having a switch operating arm, said switch being fixed in position at a distance from said second die equal to the desired length of said smaller cross section with said arm in the path of the forward end of the extruded article, and electrical means operated by said switch for releasing said second stop means for movement to release said second die.

References Cited in the file of this patent

UNITED STATES PATENTS

| 413,460 | Roney | Oct. 22, 1889 |
| 567,606 | McCool et al. | Sept. 15, 1896 |
| 1,854,411 | Leighton | Apr. 19, 1932 |
| 2,231,336 | Heron | Feb. 11, 1941 |
| 2,365,482 | Manken et al. | Dec. 19, 1944 |
| 2,530,669 | Thornton et al. | Nov. 21, 1950 |

FOREIGN PATENTS

| 544,114 | Great Britain | Mar. 27, 1942 |